D. A. WOODWARD.
Camera-Attachments.
No. 153,880. Patented Aug. 4, 1874.
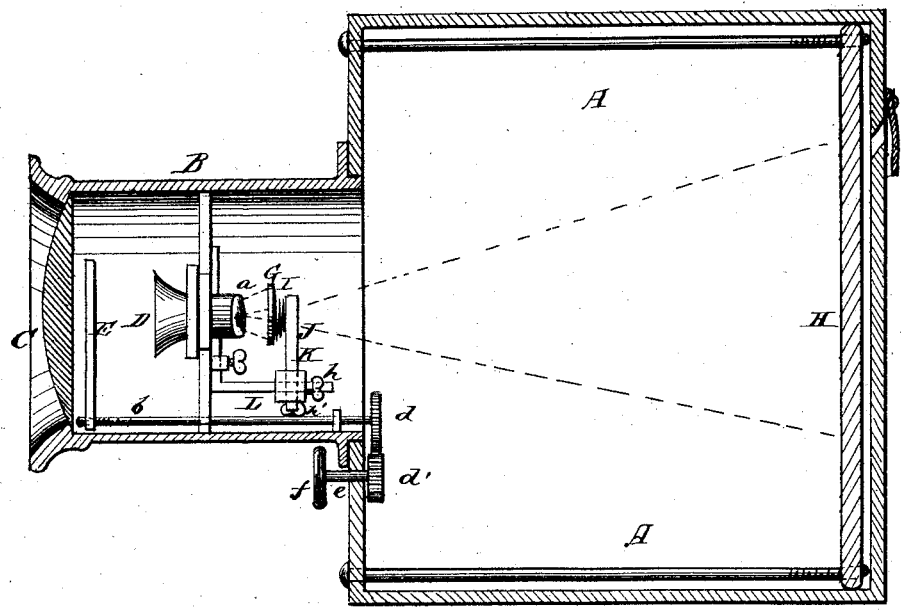
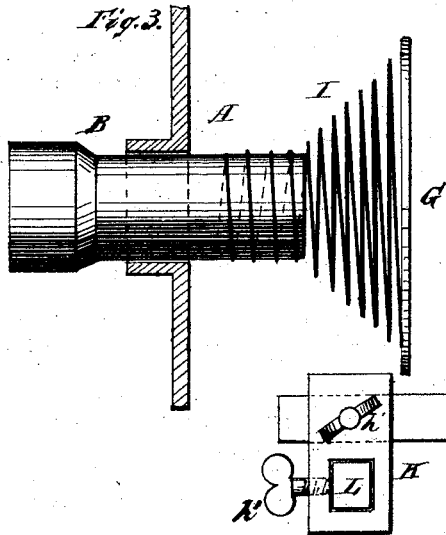
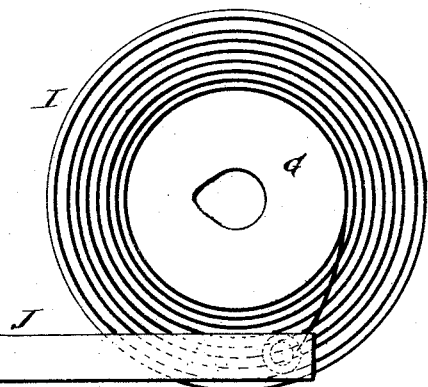
WITNESSES:
P. C. Dieterich
H. C. Scott
INVENTOR
David A. Woodward
per C. H. Watson & Co
ATTORNEYS

UNITED STATES PATENT OFFICE.

DAVID A. WOODWARD, OF BALTIMORE, MARYLAND.

IMPROVEMENT IN CAMERA ATTACHMENTS.

Specification forming part of Letters Patent No. 153,880, dated August 4, 1874; application filed May 23, 1874.

*To all whom it may concern:*

Be it known that I, DAVID A. WOODWARD, of Baltimore, in the county of Baltimore and State of Maryland, have invented certain new and useful Improvements in Camera Attachments; and I do hereby declare that the following is a full, clear, and exact description thereof, which will enable others skilled in the art to which it pertains to make and use the same, reference being had to the accompanying drawings and to the letters of reference marked thereon, which form a part of this specification.

My invention relates to vignetting devices for photographic camera; and the nature of my invention consists in a vibrating spring, in combination with a vignetting device and a camera, for the purpose of automatically vibrating the vignetter for the purpose of blending and softening the lines around the picture. It also consists in the construction of the devices for adjusting the vibrating vignetter in a solar camera, all of which will be hereinafter more fully set forth.

In the accompanying drawing, Figure 1 is a horizontal section of a solar camera with my vibrating vignetter arranged therein. Fig. 2 is a side elevation of the vibrating vignetter, and Fig. 3 shows a modification of the same as applied to an ordinary camera.

A represents the box of a solar camera with the projecting drum B. In the outer end of this drum is the condensing-lens C, and at a suitable point within the drum is a tube, D, containing the object-lens $a$. Between the two lenses is placed the negative E, which is adjusted by means of a screw-rod, $b$. This screw-rod is supported in suitable bearings, and has a pinion, $d$, on its inner end, which gears with a cog-wheel, $d'$, on a short counter-shaft, $e$, passing through the front of the box A, and provided on its outer end with a small wheel, $f$, by means of which the gears $d'$ $d$ and screw-rod $b$ are turned, adjusting the negative E, as required. In the back of the box A is the usual drawing-board H for holding the paper upon which the print is to be taken from the negative. Between the object-lens $a$ and the drawing-board H a vignetting device, G, is located, which usually consists of a piece of card-board or other similar material with an opening of suitable size through it.

This device has to be moved slightly back and forth, or otherwise the edge of the opening will produce a ring or mark around the picture on the photograph.

To obviate this difficulty is the object of my invention, and I accomplish the same by attaching the vignetting device G to a vibrating spring, I, or to a spring that, by a slight blow or movement of the camera, will be caused to vibrate for a suitable length of time.

In a solar camera this spring is attached to a horizontal bar, J, which runs crosswise of the drum, and is adjusted in a holder, K, and held at any suitable point in the same by a set-screw, $h$. The holder K is adjustable upon a bar, L, which runs lengthwise of the drum, and the holder is secured at any desired point on said bar by a set-screw, $h'$.

The bar L may also be made adjustable and held by a set-screw, as shown in Fig. 1, so that the vignetting device G can be adjusted to a nicety, exactly as it is wanted.

By simply tapping or moving the camera ever so slight the vignetting device is made to vibrate automatically, producing the desired result.

In an ordinary camera, when the spring I is made of a coiled or spiral spring, one end may be made of such a size as to fit over the tube of the camera, as shown in Fig. 3.

Having thus fully described my invention, what I claim, and desire to secure by Letters Patent, is—

1. A vibratory spring, in combination with a vignetting device and camera, substantially as and for the purpose set forth.

2. A vibratory spring, in combination with a vignetting device, substantially as and for the purpose described.

3. The combination of a vignetting device, G, spring I, adjustable bar J, adjustable holder K, and bar L, substantially as and for the purpose specified.

In testimony that I claim the foregoing as my own I affix my signature in presence of two witnesses.

DAVID A. WOODWARD.

Witnesses:
C. H. WATSON,
J. TYLER POWELL.